Figure 1:
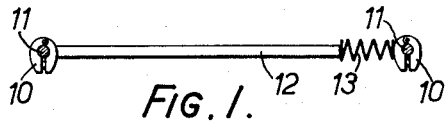

July 26, 1966  A. CAUNT  3,263,021
CABLE SPACERS FOR MULTI-CONDUCTOR ELECTRICAL
OVERHEAD TRANSMISSION LINES
Filed May 13, 1965  4 Sheets-Sheet 1

Alan Caunt
INVENTOR

BY Russell & Moore
ATTORNEYS

Alan Caunt
INVENTOR

BY Russell & Moore
ATTORNEYS

July 26, 1966 A. CAUNT 3,263,021
CABLE SPACERS FOR MULTI-CONDUCTOR ELECTRICAL
OVERHEAD TRANSMISSION LINES
Filed May 13, 1965 4 Sheets-Sheet 3

Alan Caunt
INVENTOR

BY Russell+Moore

ATTORNEYS

United States Patent Office 3,263,021
Patented July 26, 1966

3,263,021
CABLE SPACERS FOR MULTI-CONDUCTOR ELECTRICAL OVERHEAD TRANSMISSION LINES
Alan Caunt, Oadby, Leicester, England, assignor to Metalastik Limited, Leicester, England, a British company
Filed May 13, 1965, Ser. No. 455,516
Claims priority, application Great Britain, May 21, 1964, 21,087/64
5 Claims. (Cl. 174—42)

This invention relates to cable spacers for holding apart the individual conductors of electrical, overhead transmission lines, while permitting a certain degree of relative movement between the conductors, particularly in the lengthwise direction of the conductors to allow for elongation of one conductor relative to another, due to unequal stretch for example, or due to wind movement of the conductors. The invention is concerned with a spacer for holding apart two, three or more conductors and more particularly, although not exclusively, two pairs of two conductors arranged in a square or a diamond formation.

Broadly, according to the present invention, a spacer for use with an electrical overhead transmission line comprises two clamps, each to grip a different conductor, one of the clamps being rigidly carried on a spacing link to which the other clamp is connected by means of a flexible connection, whereby in use of the spacer, relative longitudinal movement of the conductors spaced by the spacer is permitted.

According to a feature of the present invention, the spacer comprises at least three clamps each to grip a different conductor, and for each clamp a spacing link, the clamp being rigidly carried on the spacing link which is connected to one other of the spacing links by means of a flexible connection, whereby a closed geometrical figure comprised of spacing links and flexible connections is formed, the arrangement of links and connections being such that in use of the spacer relative longitudinal movements of the conductors spaced by the spacer is accommodated.

The flexible connection or connections may take any one of a large variety of different forms falling within three general categories. These are metal springs, metal-to-metal sliding joints and joints comprising rubber or rubber-like material hereinafter referred to generally as "rubber." The metal springs may be close or open coiled springs or leaf springs or blade springs or flexible wire cables or again a combination of such springs in which one of the springs might also form the spacing link. The metal-to-metal sliding joints may be universal joints, e.g., ball joints, or double hinge joints, or again loosely articulated joints, allowing universal hinging movements like chain links for example. The rubber joints may comprise cylindrical, conical, double conical or part spherical rubber bushes which allow hinging movements by distortion of the rubber or rubber-like material. Again a rubber joint may comprise, simply, a mass of rubber in a socket or housing in one link and in which the end of another link is embedded. The end of the other link may be enlarged. For example, the link may have a ball end.

Figure 3:
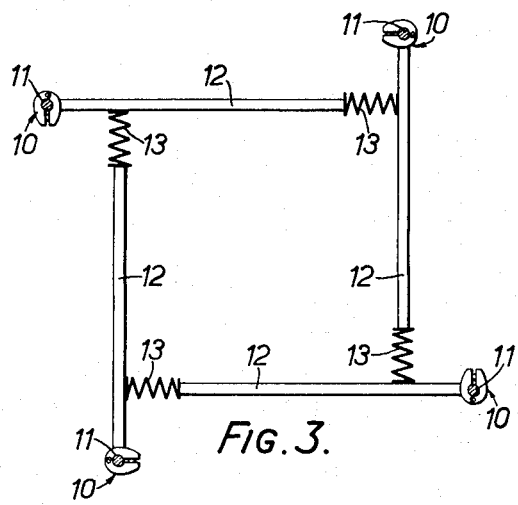
Figure 4:
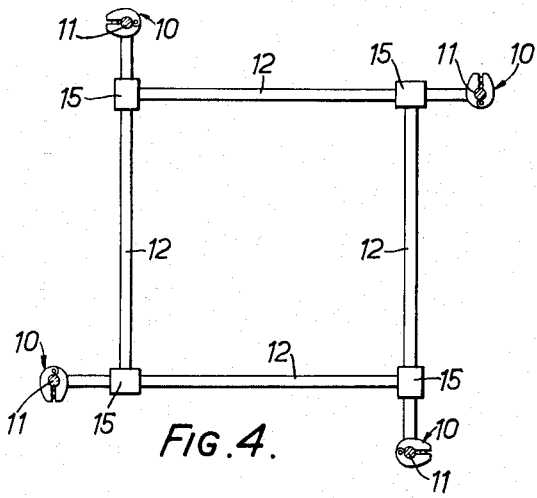
Figure 5:
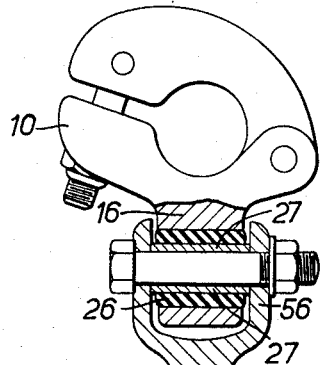
Figure 5:
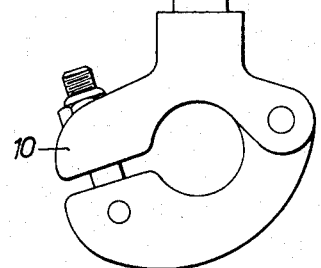
Figure 6:
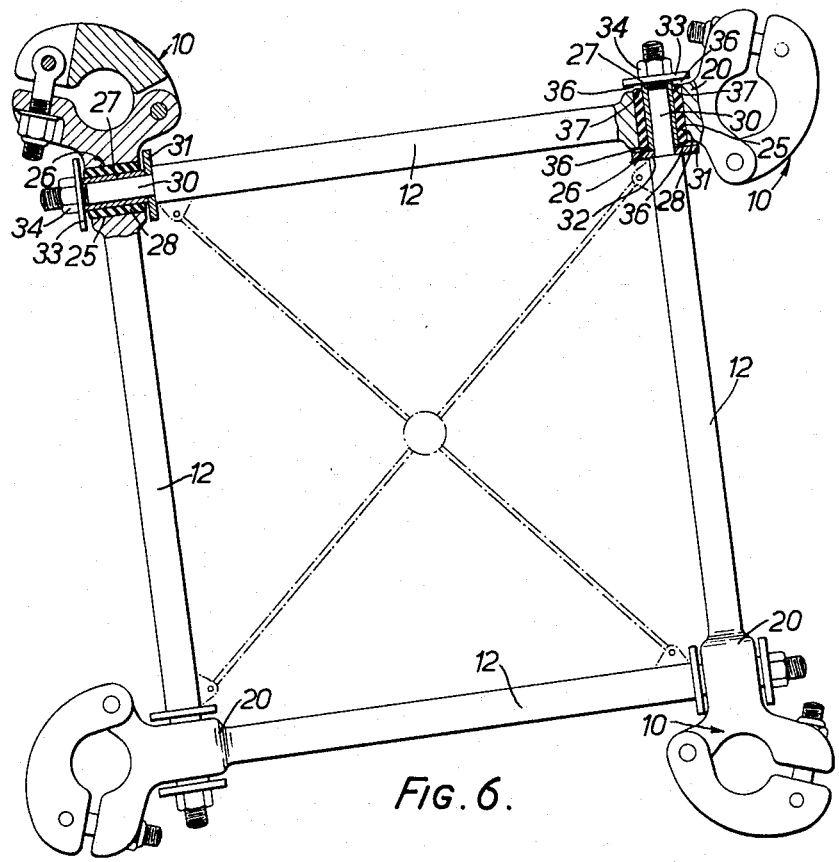
Figure 11:
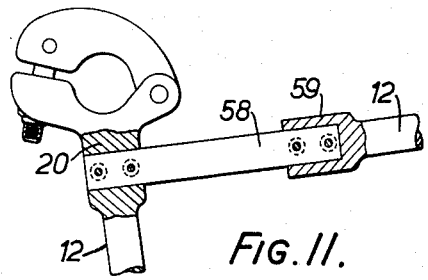
Figure 12:
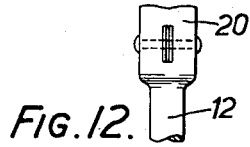

Embodiments of the present invention will now be described, merely by way of example, with reference to the accompanying drawings in which:

FIGS. 1, 2, 3 and 4 are diagrammatic illustrations of general forms of cable spacers according to the invention, FIG. 5 is an elevation in part in section of a twin cable spacer according to the present invention, FIG. 6 is an elevation in part in section of a quad-cable spacer according to the present invention, FIGS. 7, 8, 9, 10 and 11, show modifications of the cable spacer illustrated in FIG. 6, and FIG. 12 is a partial view of FIG. 11.

FIG. 1 shows the general form of a twin cable spacer according to this invention comprising two clamps 10 one to grip each of the conductors indicated at 11, and a straight, rigid spacing link 12. The left hand clamp 10 in FIG. 1 is rigidly carried on one end of the link 12. The other end of the link 12 is connected to the other clamp 10 by a flexible spring connection 13. The spring connection 13 may be open or close coiled springs or blade springs or leaf springs or they may be composed of short lengths of stranded wire cable for example. The spring connections 13 might also be composed of a combination of different kinds of spring for example a blade spring within a close coiled spring might be used.

Figure 2:
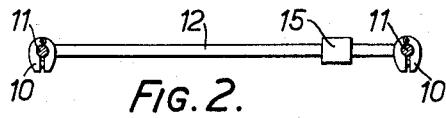

Referring to FIG. 2, in this case the flexible spring connection is replaced by a flexible connection 15 which may comprise a metal-to-metal sliding joint, for example a ball and socket joint, or any other form of universal joint, e.g., a double hinge joint allowing a limited relative angular adjustment about two axes at right angles. Again, the flexible connection 15 may be made up of two or more loosely articulated chain links. Instead of a metal-to-metal sliding joint the flexible connection 15 may be formed by a flexible joint comprising rubber distortion of which provides the flexibility in the joint.

FIG. 3 shows the general form of spacer according to this invention for four conductors arranged in square formation and using flexible spring connections 13. Four clamps 10 are provided one to grip each of the conductors indicated at 11. The spacer comprises four straight, rigid spacing links 12 and the clamps 10 are rigidly carried on one end of each of these links respectively. The other end of each link 12 is connected to one other of the links 12 adjacent the clamp on the link by a flexible spring connection 13 of any of the forms above described whereby the links and spring connections together form a square with a spring connection at each corner of the square.

Referring to FIG. 4, in this case, the ends of the links 12 remote from the clamps 10 are connected to the adjacent link in the square by a flexible connection 15 which may take any of the forms above described. If ball and socket joints are employed, the sockets may be formed in the links adjacent the clamps, the balls being formed on the ends of the links remote from the clamps. Alternatively, however the reverse arrangement might well be used.

If connections 15 comprising rubber are used, the rubber may be housed in a socket in one link 12 adjacent the clamp 10 on the link, the rubber receiving the end (which may be a ball end) of another link 12 remote from the clamp 10 on the link. The reverse arrangement is however possible as will be seen from the embodiment of the invention hereinafter described with reference to FIG. 8. The rubber is preferably in the form of a bonded rubber bush or bushes which may be cylindrical, frusto-conical or spherical in form although unbonded constructions are possible using unsleeved rubber bushes as hereinafter described with reference to FIG. 10 for example.

In the specific embodiment of cable spacer illustrated in FIG. 5, the rigid, metal spacing link 12 has rigidly fixed to it, at one end, a hinged jaw conductor clamp 10. However, any other known or convenient form of conductor gripping or clamping device may be used. At its other end, the link 12 carries by means of a flexible connection, a further hinged jaw conductor clamp 10. The further clamp 10 has a lug 16 with a cylindrical bore or socket the cylindrical axis of which lies normal to the conductors to be spaced. A cylindrical rubber bush 26 comprising an inner metal sleeve 27 and a rubber sleeve 28 bonded to the metal sleeve is provided in the socket 16. The metal sleeve 27 is longer than the rubber sleeve 28 and projects from it at each end of the rubber sleeve. The rubber sleeve is held in radial precompression between the metal sleeve 27 and the wall of the socket 16. Said other end of the link is formed with a fork 56. The fork receives between its arms the lug 16 and a bolt 60 passes through the sleeve 27 of the bush to clamp the fork arms against the end of the sleeve whereby the sleeve is gripped to move with the bolt.

Since the cylindrical axis of the bush 26 lies normal to the direction of the conductors in use of the spacer, the greatest freedom is provided for relative longitudinal movements between the conductors because such movements are accommodated by torsional deformation of the rubber sleeve. Conical deformation of the rubber bush resulting from tilting of the axis of the sleeve 27 in relation to the cylindrical axis of the bore in the lug 16 is limited by engagement of the fork arms with the free end faces of the rubber sleeve.

In the specific embodiment of cable spacer illustrated in FIG. 6 each straight, rigid metal spacing link 12 has rigidly fixed to it at one end a hinged jaw conductor clamp 10. However, as before, any other known or convenient form of conductor gripping or clamping device may be used. One of the hinged jaw parts of each clamp 10 has a lug 20 formed at or united with the end of the link, which is of circular cross-section as in FIG. 5.

The lug 20 has a cylindrical bore or socket 25 the cylindrical axis of which lies in the plane of the spacer normal to the long axis of the link to which the lug is fixed.

A cylindrical rubber bush 26 comprising an inner metal sleeve 27 and a rubber sleeve 28 bonded to the metal sleeve as previously described is provided in the socket 25. The metal sleeve 27 projects from the rubber sleeve at each end of the rubber sleeve.

The metal sleeve 27 receives the end of the adjacent link 12 remote from its clamp 10 for which purpose the end of the link has a reduced diameter portion 30 which is a close fit in the sleeve. A steel or aluminium washer 31 abuts the shoulder 32 formed by the reduced diameter portion 30 the free end part of which is screw threaded to and receives a further washer 33 and a clamping nut 34 to clamp the ends of the metal sleeve 27 between the washers 31 and 33 and thereby clamp the sleeve firmly against movement relative to the adjacent link 12.

Because the metal sleeve 27 projects from the rubber sleeve 28 at each end, a gap 36 is formed between the free end faces 37 of the rubber sleeve and the adjacent washer 31 or 33.

The links 12 form a square with the clamps 10 correctly spaced yet permitting relative movements of the conductors. Since the cylindrical axes of the bushes are in the plane of the spacer the greatest freedom is provided for relative longitudinal movements between the conductors because movements are accommodated by torsional and conical deformation of the rubber sleeves of the bushes. Any tendency for diagonally opposite conductors to approach one another resulting in "lozenging" of the spacer is resisted by the rubber sleeves of the bushes which are then subjected to conical deformation. The conical stiffness of the bushes is high compared with their torsional stiffness. If the conical stiffness of the bushes cannot be made sufficiently great to provide the necessary resistance to lozenging then the cable spacer may be cross-braced for example as described in British Patent No. 978,167. One such cross-bracing arrangement is illustrated in chain dotted outline and comprises a pair of diagonally arranged flexible wire or the like ties. Alternatively a single diagonal strut may be employed connected in the system at one or both its ends by means of a flexible connection so as to provide the necessary freedom of longitudinal movement of the conductors in use of the spacer.

The washers 31, 33 not only locate the bushes but serve also as buffers, the washers co-operating with the free end faces 37 of the rubber sleeves to limit the overall relative movements of the conductors where required, under extreme overload conditions.

The cable spacers described with reference to FIGS. 3, 4 and 6 may be adapted for three conductors or for more than four conductors. For three conductors, three links 12 would be provided arranged and connected in triangular formation by three flexible connections 13, 15 or 26 one at each corner of the triangle. For five conductors five links 12 would be provided arranged and connected in pentagonal formation by five flexible connections, one at each corner of the pentagon and so on there being always a like number of links 12 and flexible connections (of whatever particular form chosen) equal to the number of conductor clamps and therefore conductors to be spaced.

In the respect that the number of flexible connections is no more than the number of conductors, spacers according to the present invention are simpler, neater, more convenient and cheaper to produce than equivalent prior art constructions. There is also the advantage that the components of the spacer may be identical thus simplifying all stages of manufacture, storage of spares and supply.

Figure 7:
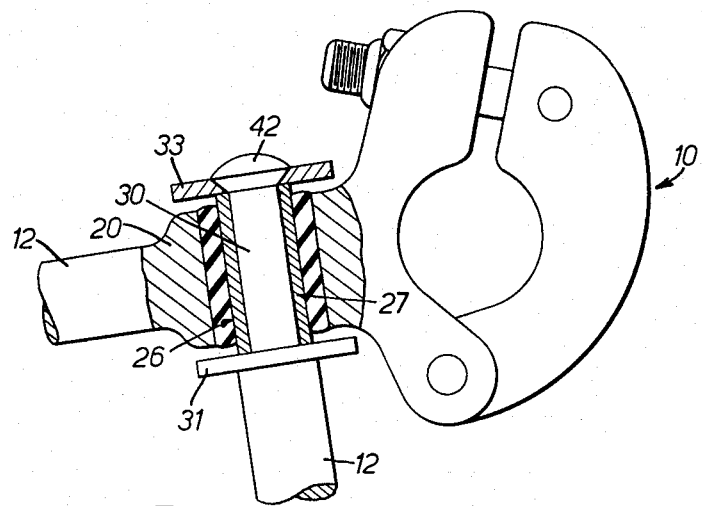

FIG. 7 illustrates a modification of the cable spacer shown in FIG. 6 resulting in a still further reduction in the number of component parts. This is achieved by dispensing with the screw threaded part at the free end of the reduced diameter end portion 30 of each link 12 and rivetting over the end of the portion 30 as at 42 to retain the washer 33 in place and to grip the sleeve 27 of the bush 26 between the two washers 33, 31. It is not generally desired or necessary to perform any dismantling or maintenance of the spacer in service. The permanent assembly achieved by rivetting is therefore acceptable in many circumstances.

Figure 8:
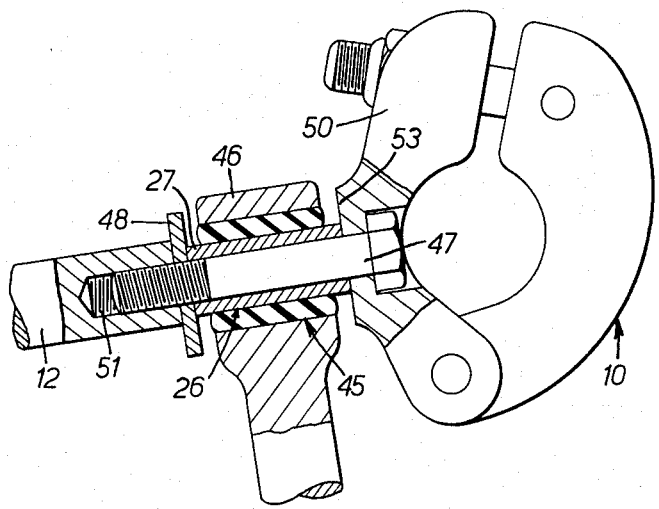

FIG. 8 illustrates a further modification of the cable spacer shown in FIG. 6 in which the cylindrical axis of each bush 26 is turned through 90° in the plane of the spacer and the bush is housed in a socket or bore 45 formed in a lug 46 at the end of a link 12 remote from the clamp 10 on the link. The sleeve 27 receives a bolt 47 fixing one of the hinged clamp jaws 50 to the end of its own, adjacent link 12 by screw threaded engagement in an axial bore 51 in the end face of the link. A washer 48 equivalent to the washer 31 previously described is incorporated on the bolt 47 between the sleeve 27 and the link, the clamp part 50 having a face 53 replacing the washer 33 previously described.

Figure 9:
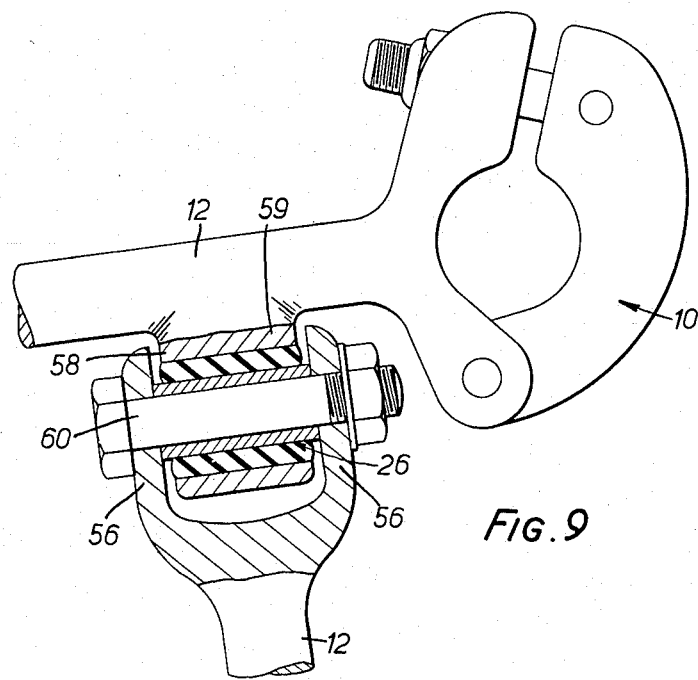

FIG. 9 illustrates a still further modification of the cable spacer shown in FIG. 6 in which each link 12 is formed directly at one end with a conductor clamp 10 and at its other end with a fork 56. Each fork 56 receives between its arms a lug 58 formed on the adjacent link 12 close to the clamp 10 on the link and each lug has a bore 59 housing a bush 26 as previously described the sleeve 27 of the bush being clamped between the arms of the fork by a bolt 60 passing through the sleeve and the fork arms.

Figure 10:
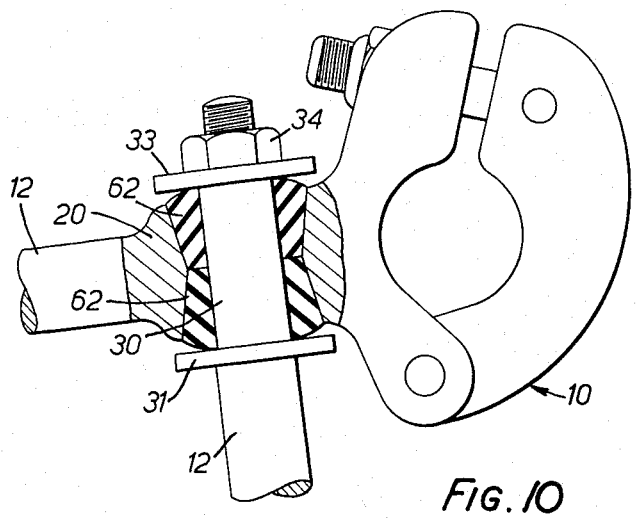

FIG. 10 illustrates a still further modification of the cable spacer shown in FIG. 6 in which the bushes 26 are replaced each by a pair of unbonded, all rubber frusto-conical rubber bushes 62 mounted directly on the reduced diameter portions 30 of the links and with their smaller diameter ends adjacent. The bushes 62 are received in double frusto-conical sockets in the lugs 20. The arrangement as just described allows a greater freedom for articulation than using cylindrical bushes. For still greater freedom, each of the sleeves 27 may be substituted with a part spherical metal part which is enveloped in a layer of rubber compressed by say three separate parts carried within the bore 25 of the lug 20 and angularly spaced. These separate parts would have a part spherical inner surface and a part cylindrical outer surface. Each lug 20 in effect would then constitute a sleeve holding the separate parts described together and pressed against the layer of rubber the whole arrangement constituting a radially precompressed rubber ball joint allowing limited relative angular movements in all directions by torsional shear deformation of the rubber layer. The rubber layers may be bonded to the inner and/or the outer parts of these joints. Equivalent rubber ball joint construction may be adopted in the modifications illustrated in FIGS. 7, 8 and 9.

Instead of having separate outer parts to form the ball joint socket within the bores of the lugs 20, 46 or 58 the lugs could be formed in two parts together defining a ball socket directly in the lug these parts being drawn together by a bolt or bolts or the like to precompress the part spherical rubber interlayer. Alternatively, the portion 30 and nut 34 could be used for this purpose in the FIG. 3 construction or the portion 30 and the rivetted end 42 in the FIG. 7 construction or the bolt 47 in the FIG. 8 construction or the fork arms 56 and the bolt 60 in the FIG. 9 construction.

FIGS. 11 and 12 illustrate a modification of the cable spacer shown in FIG. 6 in which the flexible rubber bush connections are replaced by flexible metal spring connections. Thus, the end of each link 12 remote from its rigidly fixed clamp 10 has an enlarged portion 59 with a blind slot in its end to receive and anchor the end of a straight, single or multi-leaved leaf spring 58 forming a straight continuation of the link. The other end of the leaf spring 58 is fixed in an open ended slot in the lug 20 of the adjacent clamp. The leaf springs may be anchored by swaging the metal parts 20, 59 to grip the ends of the spring. Alternatively bolts or rivets may be used as illustrated.

A flexible metal spring connection as just described may be used in the twin cable spacer construction described with reference to FIG. 5. The link 12 would have an enlarged end portion 59 replacing the forked end 56 and receiving one end of the leaf spring. The other end of the leaf spring is anchored in a blind slot in the end face of the lug 16, the spring extending straight in line with the link 12.

It is to be noted that the leaf spring is one of elongated rectangular cross-section and is arranged with its greater cross-sectional dimension in the plane of the spacer in FIG. 11. Where the spring is employed in a twin cable spacer, the spring is arranged with its major cross-sectional dimension normal to the direction of the conductors to be spaced. In this way it is ensured that the flexibility provided by the spring permits limited relative longitudinal movement of the conductors.

Although only two specific forms of twin cable spacer have been described having a flexible connection as shown in FIG. 5, or FIG. 11 it is to be understood, that the flexible connection could take any of the other forms hereinbefore described by way of example for the multi-conductor spacers according to the invention which have been described.

I claim:

1. A cable spacer for holding apart at least three individually suspended generally parallel conductors of an electrical overhead transmission line, comprising a plurality of conductor clamps one to grip each of the conductors, a plurality of spacing links, one only for each clamp and rigidly connected with the clamp, and a plurality of flexible connections one only for each clamp for permitting relative longitudinal movements of conductors spaced by the spacer, said links being flexibly connected each with one other of the links by one of the flexible connections, the links and flexible connections together forming a closed geometrical figure.

2. A cable spacer as claimed in claim 1 in which each link is flexibly connected at one end to one other of the links and, at its other end is rigidly attached to one of the clamps.

3. A cable spacer as claimed in claim 2 in which each link is flexibly connected at said one end thereof to said one other of the links by a rubber bush housed in a bore in one of the links, the bush receiving the other of the links.

4. A cable spacer as claimed in claim 3 in which the bush is housed in a bore located adjacent the clamp which is rigidly attached to said one of the links.

5. A cable spacer as claimed in claim 3 in which the bush is housed in a bore located at the end of said one of the links remote from the clamp which is rigidly attached to the link.

References Cited by the Examiner
UNITED STATES PATENTS

| | | | |
|---|---|---|---|
| 931,353 | 8/1909 | Varney | 191—41 |
| 3,113,173 | 12/1963 | Horovitz | 174—146 X |

FOREIGN PATENTS

| | | |
|---|---|---|
| 666,713 | 5/1929 | France. |
| 1,356,816 | 2/1964 | France. |
| 829,215 | 5/1952 | Germany. |

LARAMIE E. ASKIN, *Primary Examiner.*